United States Patent [19]

Miura et al.

[11] Patent Number: 4,840,640
[45] Date of Patent: Jun. 20, 1989

[54] POLARIZING FILM: POLYMER FILM BASE CONTAINING SUBSTITUTED ANTHRAQUINONE DICHROIC DYE

[75] Inventors: Konoe Miura, Yokohama; Tetsuo Ozawa, Hadano; Seigo Okumura, Machida; Hidetoshi Urashima, Kitakyushu, all of Japan

[73] Assignee: Mitsubishi Chemical Industries Limited, Japan

[21] Appl. No.: 62,881

[22] Filed: Jun. 16, 1987

[30] Foreign Application Priority Data

Jun. 17, 1986 [JP] Japan ................. 61-140956

[51] Int. Cl.[4] .................... C09B 1/22; G02B 1/08; G02B 5/30
[52] U.S. Cl. ............................. 8/506; 8/512; 8/516; 8/675; 8/677; 8/690
[58] Field of Search ............ 8/506, 512, 516, 677

[56] References Cited

U.S. PATENT DOCUMENTS 2,882,119  4/1959  Laucius et al. .................. 8/611
4,115,056  9/1978  Koller et al. ................... 8/543

FOREIGN PATENT DOCUMENTS 54-045153  4/1979  Japan .

Primary Examiner—A. Lionel Clingman
Attorney, Agent, or Firm—Jordan B. Bierman

[57] ABSTRACT

A polarizing film which comprises a film base having thereon an anthraquinone dye of general formula (I):

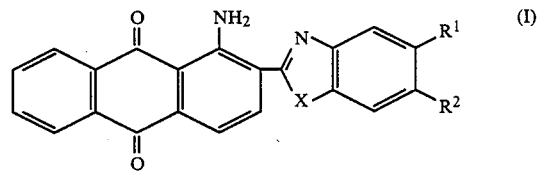

wherein $R^1$ and $R^2$ each represents a hydrogen atom, an alkyl group, an alkoxy group, an aralkyloxy group, an aryl group, a cyclohexyl group, a 4-alkylcyclohexyl group, a carboxylic acid ester group, a carboxylic acid amide group, a halogen atom,

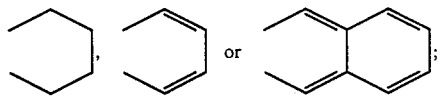

X represents an oxygen atom, a sulfur atom or an amino group.

6 Claims, No Drawings

POLARIZING FILM: POLYMER FILM BASE CONTAINING SUBSTITUTED ANTHRAQUINONE DICHROIC DYE

BACKGROUND OF THE INVENTION

The present invention relates to a polarizing containing an anthraquinone dye.

FIELD OF THE INVENTION

Polyvinyl alcohol (PA) based films having iodine or a dichroic dye fixed thereto are well known as polarizing films. Such conventional polarizing films have good polarizing performances but their resistance to heat and moisture is not so good. In order to solve this problem, lamination with protective films such as those based on cellulose acetate has been proposed and polarizing films manufactured by this method have been commercialized. But depending on the field of use, even such laminated polarizing films are sometimes suffered from moisture attack.

Polarizing films that employ non-PVA hydrophobic polymers as their base have been reviewed and it has been proposed to form a polyene structure by removing hydrogen halides from vinyl halide based polymers such as PVC and PVDC. However, for several reasons such as low heat resistance, insufficient stability to light and oxygen, and very small latitude in the choice of colors, these polarizing films have not yet gained much popularity.

Japanese Patent Publication No. 3944/74 and Japanese Patent Application (OPI) No. 45153/79 (the term "OPI" as used herein refers to a "published unexamined Japanese patent application") show polyamide based polarizing films. Polarizing films employing this polyamide-dye combination have higher heat and moisture resistance and mechanical strength than those based on the PVA-iodine combination, the PVA-dichroic dye combination, or polyenes, but their polarizing performance is poor as compared with the last-mentioned three types of polarizing films.

Under these circumstances, the present inventors conducted intensive studies in order to develop a novel polarizing film that not only has high polarizing performance but also possesses good use characteristics such as resistance to heat, moisture and weather, and transparency. As a result, the present inventors found that this object can be attained by employing an organic resin polymer as a film base and by incorporating in this polymer a dye that is highly soluble in it and which has high dichroism.

SUMMARY OF THE INVENTION

The present invention has been accomplished on the basis of this finding.

The present invention provides a polarizing film that comprises a film base having thereon an anthraquinone dye of general formula (I):

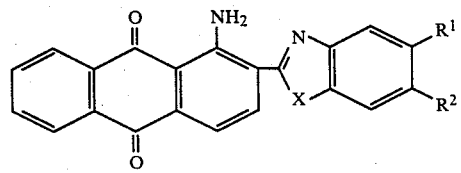

wherein $R^1$ and $R^2$ each represents a hydrogen atom, an alkyl group, an alkoxy group, an aralkyloxy group, an aryl group, a cyclohexyl group, a 4-alkylcyclohexyl group, a carboxylic acid ester group, a carboxylic acid amide group, a halogen atom,

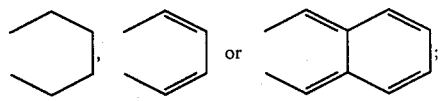

X is an oxygen atom, a sulfur atom or an amino group.

DETAILED DESCRIPTION OF THE INVENTION

The structure of the anthraquinone compound having the formula (I) is hereunder described in detail.

The alkyl or alkoxy group denoted by $R^1$ and $R^2$ which may be the same or different typically has 1 to 18 carbon atoms, with the range of 1 to 9 carbon atoms being preferred. The aralkyloxy group denoted by $R^1$ and $R^2$ is preferably a benzyloxy group, which may be substituted by an alkyl or alkoxy group having 1 to 18, preferably 1 to 9, carbon atoms. The aryl group denoted by $R^1$ and $R^2$ is preferably

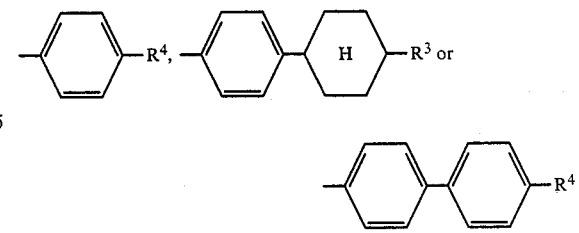

(wherein $R^3$ is a hydrogen atom or the same alkyl group as denoted by $R^1$; $R^4$ is a hydrogen atom or the same alkyl or alkoxy group as denoted by $R^1$). The 4-alkylcyclohexyl group denoted by $R^1$ and $R^2$ is preferably a trans-4-alkylcyclohexyl group that is substituted by $C_1$–$C_9$ alkyl group. Examples of the carboxylic acid ester group denoted by $R^1$ and $R^2$ include

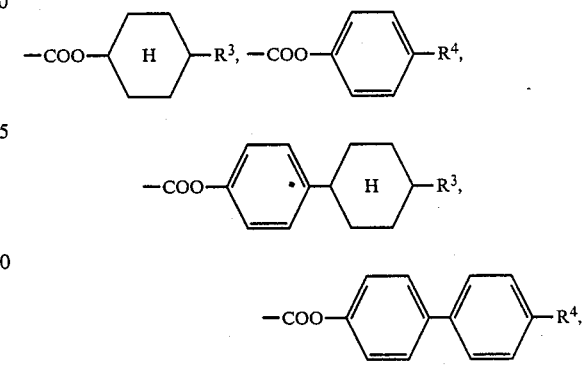

and —COO—$R^5$ ($R^5$ is the same alkyl group as denoted by $R^1$). Examples of the carboxylic acid amide group denoted by $R^1$ and $R^2$ include

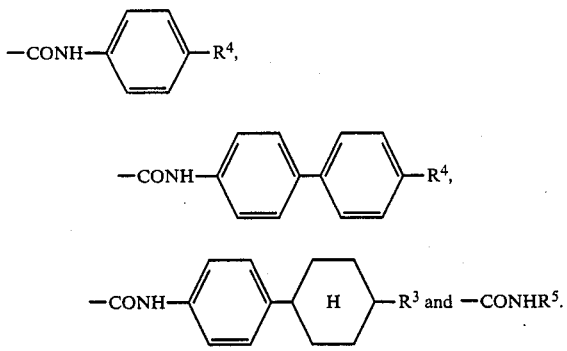

Examples of the halogen atom denoted by $R^1$ and $R^2$ include, F, Cl and Br atoms.

Examples of the organic resin that is used as the film base in the present invention include: polyesters, polycarbonates, polyether sulfones, polyimides, polyamides, vinyl halide polymers, vinylidene halide polymers, polyvinyl alcohols, ethylene-vinyl acetate copolymers, cellulosics, polyvinyl butyrals, liquid crystalline polymers and the like. Illustrative liquid crystalline polymers are copolyesters of polyethylene terephthalate-parahydroxybenzoic acid.

Among these highly heat- and moisture-resistant polymers, polyesters, polyamides, polyimides, and copolyesters liquid crystalline of polyethylene terephthalate-parahydroxybenzoic acid are preferably used.

The polarizing film of the present invention is produced by incorporating 0.01 to 10 wt%, preferably 0.05 to 5 wt%, of the anthraquinone dye in the film bases mentioned above.

Depending on the need, two or more of the anthraquinone compounds specified above may be used in admixture. The polarizing film of the present invention may also contain other dichroic dyes, non-dichroic dyes, or any suitable additives such as UV absorbers, antioxidants, etc.

The polarizing film of the present invention is typically produced by the following procedure: a composition comprising an organic resin serving as the film base, an anthraquinone compound and any other necessary component is melted to a homogeneous state and shaped into a film or sheet form; then, the film or sheet is stretched uniaxially by a stretch ratio of from 3 to 12 times at a temperature of from 20° to 200° C. and further heat-treated at 100° to 250° C. for a period of from one second to 30 minutes so as to make a film with a thickness typically ranging from 30 to 200 μm. If necessary, the drawing operation may be conducted in two directions, for example, a longitudinal direction and a traversal direction at right angles.

The copolyester liquid crystalline of polyethylene terephthalate-parahydroxybenzoic acid is a polyester resin that is formed by copolymerizing a polyethylene terephthalate component (A) and a parahydroxybenzoic acid component (B) with the (A) to (B) molar ratio being adjusted to be within the range of 40:60 to 5:95. This resin forms a "thermotropic" liquid crystal which, in a molten state, exhibits anisotropy which observed under a polarizing microscope employing crossed Nicol prisms.

In order to make a polarizing film from this liquid crystalline polyester resin, it is first blended with a dichroic acid and the mixture is melted and formed into a film through a die, typically rectangular or circular in cross section, under appropriate shear and draft conditions. Higher shear rates are desirably employed. Although satisfactory film orientation and transparency can be attained under the commonly employed film-forming conditions (shear rate: several ten to several hundred sec$^{-1}$), even better results are attainable by forming a film with a shear rate of 1,000 sec$^{-1}$ or above.

In order to provide transparency, the thickness of the film to be produced is usually set at a value of not larger than 100 μm.

The polarizing film thus produced may be immediately used in the form of a film or sheet. If desired and depending on the specific object of use, the polarizing film may be subjected to a suitable treatment prior to use, such as formation of a protective layer by lamination with a suitable polymer such as a triacetate, acrylic or urethane polymer, or formation of a transparent film of an electroconductive material, such as an indium-tin oxide, on the surface of the polarizing film by evaporation, sputtering or coating.

The coefficient of dye orientation (Fdye) of the anthraquinone compound which is to be used as a dichroic dye in the present invention can be calculated by the following equation.

$$Fdye = (D-1)/(D+2) \qquad (1)$$

where D is the dichroic absorbed ratio of the dichroic dye containing film and is given by the following formula:

$$D = \log(I_o/I_{II})/\log(I_o/I_I) \qquad (2)$$

wherein $I_o$ is the transmittance of an undyed film prepared by the same drawing and treating conditions; $I_I$ is the transmittance of this film for the case where the plane of polarization of incident ray is perpendicular to the axis of drawing; and $I_{II}$ is the transmittance of the film for the case where the plane of polarization is parallel to the axis of drawing.

Therefore, the value of Fdye indicates the degree of orientation of the dichroic dye and the larger this value, the higher the polarizing performance of the polarizing film.

The following examples are provided for the purpose of further illustrating the present invention but it should be understood that various modifications of these examples are possible to the extent that they will not depart from the scope and spirit of the invention. In the examples, parts are shown based on a weight.

EXAMPLE 1

A mixture of 100 parts of a polyethylene terephthalate oligomer (ηinh: 0.10 dl/g), 288 parts of parahydroxybenzoic acid and 0.13 part of stannous acetate was stirred at 220° C. for 1 hour under a nitrogen stream. After the mixture was cooled to 140° C., 266 parts of acetic anhydride was added, followed by stirring for an additional 1.5 hours.

With acetic acid being distilled off, the mixture was heated to 275° C. and 0.23 part of zinc acetate dihydrate was added. Thereafter, the pressure in the reactor was gradually decreased to 0.3 Torr and the mixture was stirred for 6 hours to complete the polymerization.

The resulting polymer was composed of a polyethylene terephthalate and a parahydroxybenzoic acid component in a molar ratio of 20:80 and displayed anisotropy in a molten state when observed under a polarizing microscope equipped with a heat stage.

This liquid crystalline polyester resin was shaped into a film with a 30-mm extruding machine through a T-die (die width, 120 mm; lip clearance, 0.2 mm). The other film-forming conditions were as follows: temperature, 275° C.; shear rate, 2,900 sec$^{-1}$; and draft ratio, 15. The film extrudate was cooled by passage through a cooling water tank with an air gap of 40 mm.

Using a Henschel mixer, 1 kg of the polyester resin was mixed 5 g of a dye having the structure noted below:

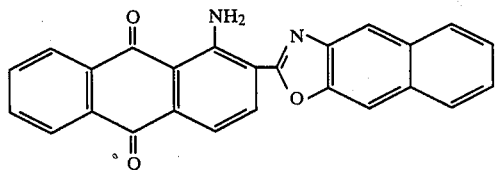

The blend was shaped by passing through a T-die as in the manner described above to make a red colored polarizing film having a thickness of 10 μm. This film had a maximum absorption at a wavelength of 517 nm and its Fdye value was 0.84.

EXAMPLE 2

One kilogram of a polyethylene terephthalate resin and 1 g of an anthraquinone dye as used in Example 1 were mixed in a molten state at 280° C. The blend was shaped into a film having a brilliant red color. This film was stretched uniaxially at 90° C. by a stretch ratio of 5 times on a T. M. Long's stretcher so as to make a red polarizing film with a thickness of 100 μm. This film had a maximum absorption at a wavelength of 519 nm and its Fdye value was 0.72.

EXAMPLE 3

A polarizing film was prepared as in Example 1 except that the anthraquinone dye of the following formula was used:

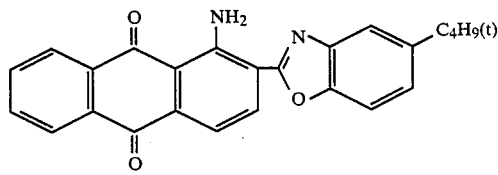

The polarizing film produced had a maximum absorption at a wavelength of 516 nm and its Fdye value was 0.69.

EXAMPLE 4

Additional polarizing films were prepared as in Example 1 using the anthraquinone dyes identified in Table 1, which also lists the maximum absorption wavelengths and Fdye values of the produced polarizing films.

TABLE 1

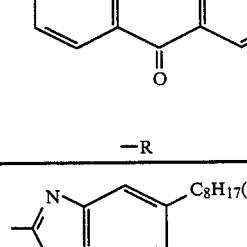

| No. | —R | λ$_{max}$ (nm) | Fdye |
|---|---|---|---|
| 1 | 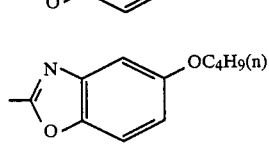 | 516 | 0.70 |
| 2 | 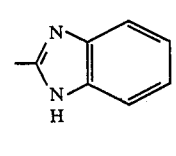 | 518 | 0.69 |
| 3 | 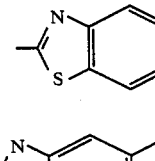 | 515 | 0.68 |
| 4 | 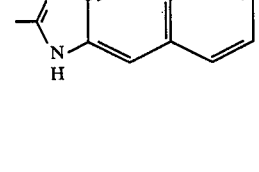 | 521 | 0.70 |
| 5 |  | 515 | 0.82 |

TABLE 1-continued

| No. | −R | λ_max (nm) | Fdye |
|---|---|---|---|
| 6 | (2-methyl-naphtho-imidazole) | 517 | 0.86 |
| 7 | 2-methyl-benzoxazole-COOC$_8$H$_{17}$(n) | 518 | 0.73 |
| 8 | 2-methyl-benzoxazole-COO-C$_6$H$_4$-C$_4$H$_9$(n) | 518 | 0.74 |
| 9 | 2-methyl-benzimidazole-COO-C$_6$H$_4$-C$_6$H$_4$-OC$_5$H$_{11}$(n) | 516 | 0.76 |
| 10 | 2-methyl-benzimidazole-COO-cyclohexyl-C$_4$H$_9$(n) | 516 | 0.75 |
| 11 | 2-methyl-benzoxazole-CONHC$_7$H$_{15}$(n) | 518 | 0.71 |
| 12 | 2-methyl-benzoxazole-CONH-C$_6$H$_4$-C$_4$H$_9$(n) | 519 | 0.73 |
| 13 | 2-methyl-benzimidazole-CONH-C$_6$H$_4$-OC$_2$H$_5$ | 516 | 0.73 |
| 14 | 2-methyl-benzimidazole-CONH-C$_6$H$_4$-C$_6$H$_4$-C$_4$H$_9$(n) | 516 | 0.74 |

TABLE 1-continued

[Structure: 1-amino-anthraquinone with R substituent at 2-position]

| No. | —R | λ_max (nm) | Fdye |
|---|---|---|---|
| 15 | 2-methylbenzoxazol-5-yl-CONH-C6H4-C6H4-OC3H7(n) | 519 | 0.75 |
| 16 | 2-methylbenzoxazol-5-yl-CONH-C6H4-cyclohexyl-C4H9(n) | 518 | 0.75 |
| 17 | 2-methyl-5-chlorobenzoxazol-6-yl | 516 | 0.68 |
| 18 | 2-methyl-5-phenylbenzoxazol-6-yl | 516 | 0.76 |
| 19 | 2-methylbenzoxazol-5-yl-C6H4-OC4H9(n) | 516 | 0.78 |
| 20 | 2-methylbenzoxazol-5-yl-C6H4-C4H9(n) | 516 | 0.78 |
| 21 | 2-methylbenzoxazol-5-yl-C6H4-C6H4-C5H11(n) | 516 | 0.83 |
| 22 | 2-methylbenzoxazol-5-yl-C6H4-cyclohexyl-C3H7(n) | 516 | 0.84 |
| 23 | 2-methyl-5,6,7,8-tetrahydrobenzimidazol-5-yl | 517 | 0.83 |
| 24 | 2-methylbenzoxazol-5-yl-OCH2-C6H4-OC4H9(n) | 518 | 0.75 |

TABLE 1-continued

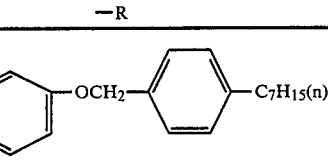

| No. | —R | λ$_{max}$ (nm) | Fdye |
|---|---|---|---|
| 25 | 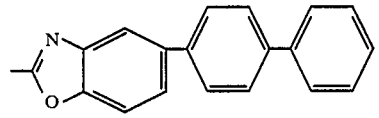 | 518 | 0.75 |
| 26 | 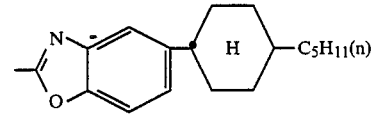 | 516 | 0.82 |
| 27 | 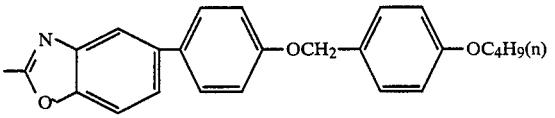 | 516 | 0.81 |
| 28 | 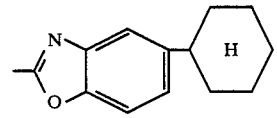 | 516 | 0.81 |
| 29 | 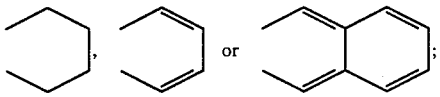 | 516 | 0.76 |

Note:

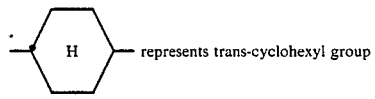 represents trans-cyclohexyl group

The polarizing film of the present invention not only has good polarizing performance but also possesses superior characteristics such as resistance to heat, moisture and weather, and transparency. Because of these features, the film may effectively used in a practical operation and has a very high commercial value.

While the invention has been described in detail and with reference to specific embodiment thereof, it will be apparent to one skilled in the art that various changes and modifications can be made therein without departing from the spirit and scope thereof.

What is claimed is:

1. A polarizing film which comprises a film base having thereon an anthraquinone dye of general formula (I):

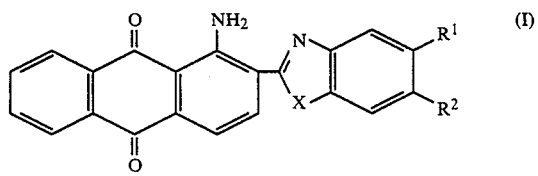

wherein $R^1$ and $R^2$ each represents a hydrogen atom, an alkyl group, an alkoxy group, an aralkyloxy group, an aryl group, a cyclohexyl group, a 4-alkylcyclohexyl group, a carboxylic acid ester group, a carboxylic acid amide group, a halogen atom, X represents an oxygen atom, a sulfur atom or an amino group.

2. The polarizing film of claim 1 wherein said film is obtained by melting an organic resin and said anthraquinone dye, forming said dye into a sheet, and stretching said sheet uniaxially.

3. A polarizing film according to claim 2, wherein the anthraquinone dye of the general formula (I) in which $R^1$ and $R^2$ each represents a hydrogen atom, $C_1$–$C_9$ alkyl group, $C_1$–$C_9$ alkoxyl group, a benzyloxy group, a benzyloxy group substituted by $C_1$–$C_9$ alkyl group or $C_1$–$C_9$ alkoxy group,

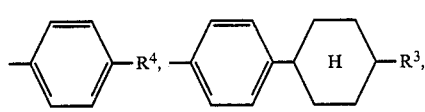

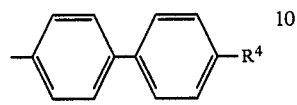

(wherein $R^3$ represents a hydrogen group or $C_1$–$C_9$ alkyl group; $R^4$ represents a hydrogen atom, $C_1$–$C_9$ alkyl group, or $C_1$–$C_9$ alkoxyl group), trans-4-alkylcyclohexyl group substituted by $C_1$–$C_9$ alkyl group,

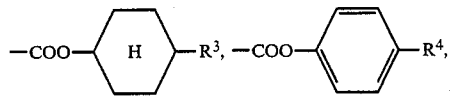

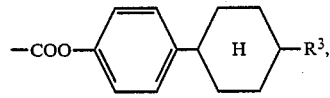

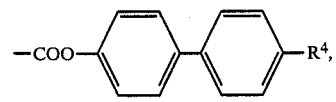

—COO—$R^5$ (wherein $R^5$ represents $C_1$–$C_9$ alkyl group),

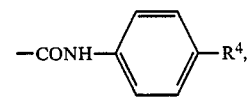

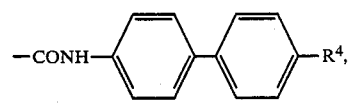

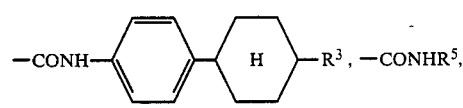

a fluorine atom, a chlorine atom or a bromine atom.

4. A polarizing film according to claim 2, wherein the anthraquinone dye is

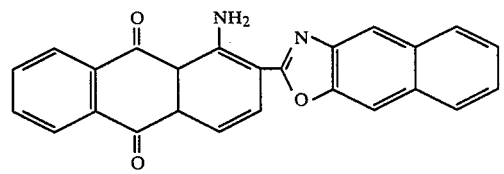

5. A polarizing film according to claim 2, wherein the anthraquinone dye is

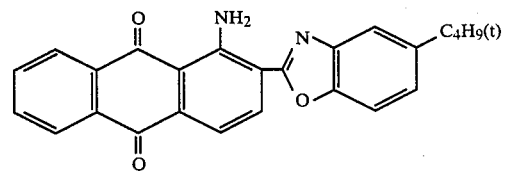

6. A polarizing film according to claim 2, wherein the highly heat- and moisture-resistant film base is of polyesters, polyamides, polyimides, or liquid crystalline polyethylene terephthalate-parahydroxybenzoic acid.

* * * * *